United States Patent [19]

Tisbo et al.

[11] 4,321,769
[45] Mar. 30, 1982

[54] EDGING STRIP

[75] Inventors: Cosmo N. Tisbo; Thomas A. Tisbo, both of Barrington, Ill.

[73] Assignee: Custom Plastics, Inc., Chicago, Ill.

[21] Appl. No.: 173,061

[22] Filed: Jul. 28, 1980

[51] Int. Cl.$^3$ ............................................. A01G 1/08
[52] U.S. Cl. ...................................................... 47/33
[58] Field of Search ................................. 47/33; 404/7

[56] References Cited

U.S. PATENT DOCUMENTS

| | | | |
|---|---|---|---|
| 1,928,447 | 9/1933 | Cornell, Jr. | 404/12 |
| 3,378,949 | 4/1968 | Dorris | 47/33 |
| 3,387,786 | 6/1968 | Rynberk | 47/33 X |
| 3,484,989 | 12/1969 | Lazinsky | 47/33 |
| 3,485,449 | 12/1969 | Wilson | 47/33 X |
| 3,545,127 | 12/1970 | Jensen | 47/33 |
| 3,788,001 | 1/1974 | Balfanz, Jr. | 47/33 |

Primary Examiner—Steven A. Bratlie
Attorney, Agent, or Firm—McWilliams, Mann & Zummer

[57] ABSTRACT

The present invention relates to an edging strip which is an integral elongated plastic member which is particularly adapted for being positioned in and on the ground to inhibit plant life from growing in a selected elongated narrow band. The edging strip includes an elongated ground cap which is adapted for positioning on an elongated narrow band of ground for shielding that ground to inhibit plant life from growing throughout, or over the cap. An elongated thin upright wall has one edge formed integral with the side of the cap which is adapted to be adjacent to the ground. The upright wall is coextensive with the cap. The upright wall is offset center from the cap so that the upright wall is closer to one edge of the cap than to the other. The edging strip includes a lip formed integral with the upright wall and extending toward the edge spaced away from the upright wall. The lip is perpendicular to and coextensive with the wall. The upright wall and integral lip are adapted to be buried in the ground beneath the cap, whereby the buried upright wall holds the cap against lateral movement relative to the ground and the lip holds the cap against vertical movement relative to the ground.

1 Claim, 4 Drawing Figures

U.S. Patent     Mar. 30, 1982     4,321,769
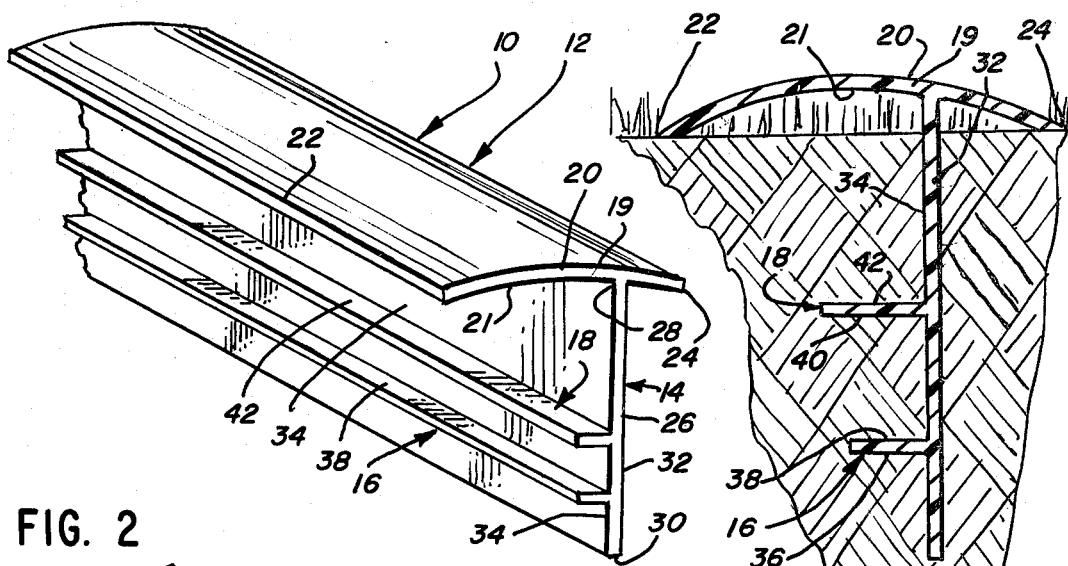
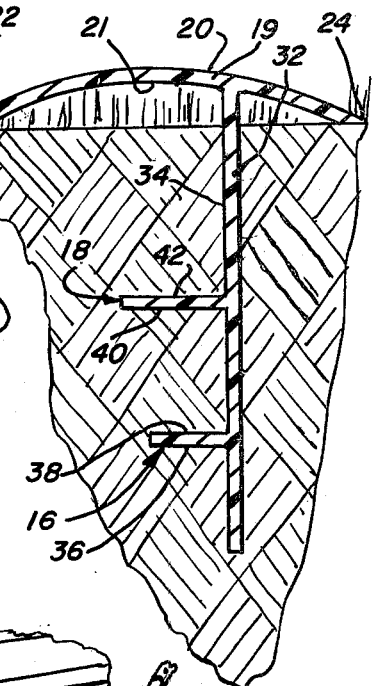
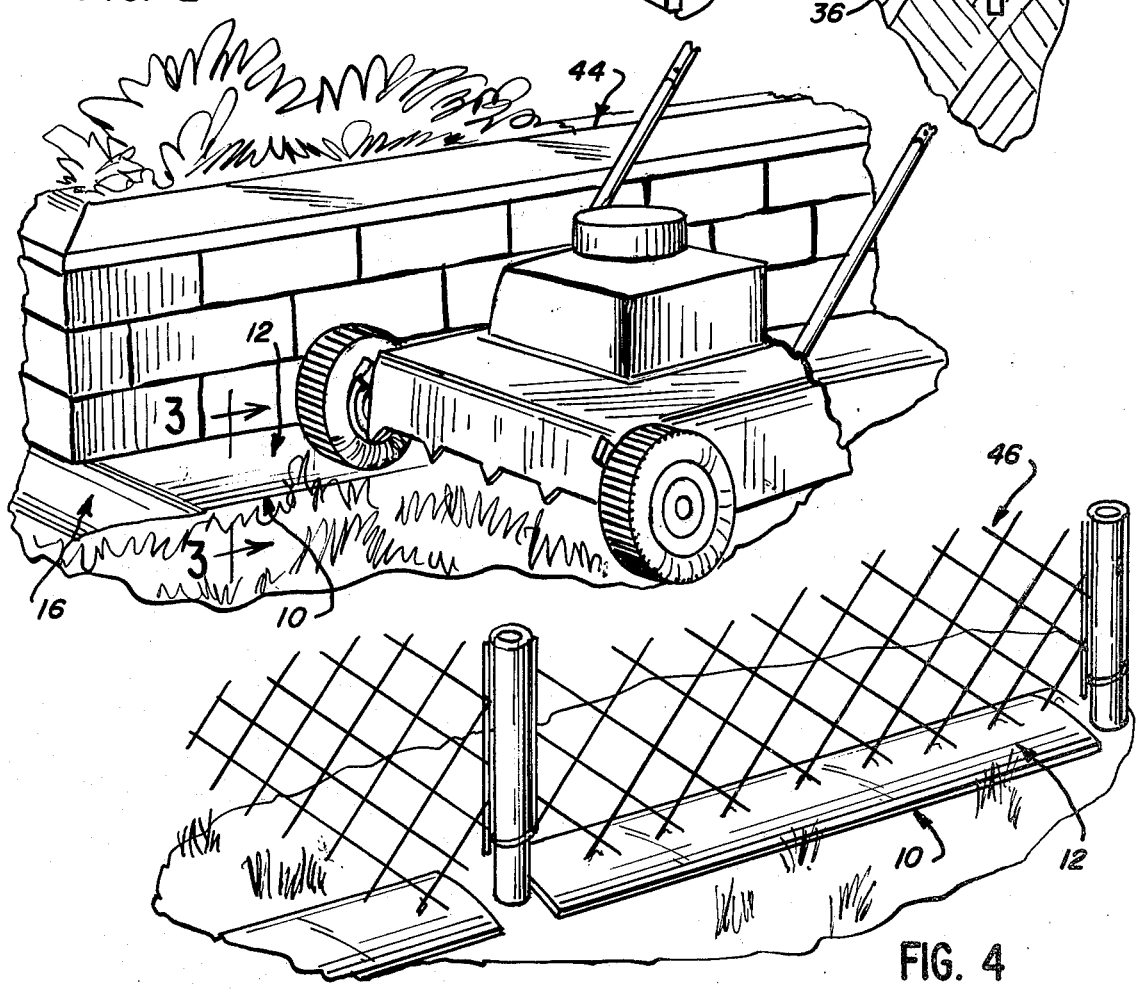
FIG. 1
FIG. 2
FIG. 3
FIG. 4

EDGING STRIP

BACKGROUND OF THE INVENTION

In many instances it is desirable to prevent plant life from growing in certain areas, such as adjacent to buildings, under fences, or the like. Lawns often extend to buildings or under fences so that it is necessary to trim the lawn adjacent to the building or under the fence. Ordinarily, a mechanical lawnmower is used to cut grass to a uniform height to give a lawn a pleasing appearance. Heretofore, when the grass was cut, the grass plants next to a fence, or building, would not be cut by the lawnmower because the lawnmower could not get close enough to the fence or building. The result was that it was necessary to cut the grass adjacent to a fence or building with a trimming device. Although trimming devices are effective, they are time consuming and in case of manually operated devices, they are very tiring for an operator.

The utilization of extruded plastic edging strips to create a border between a lawn and other vegetation or growing area is well known. A patent showing this general concept is U.S. Pat. No. 3,387,786 to Rynberk. The Rynberk disclosure teaches edging which is buried in the ground to keep plant life separated. However, Rynberk does not teach the concept of preventing any plant life from growing in given areas. What Rynberk does teach is the concept of separating plants so that grass does not grow into an area, such as, a flower garden.

It is well known that for a plant to grow, the plant generally must have a supporting surface, such as, soil, water and light. If a plant does not have water and light, the plant will not grow. The utilization of plastic sheeting to cover an area to prevent plant life from growing is well known. It is recognized that if it is desirable to eliminate the growth of plant life, an elongated strip, such as, the Traffic Marking Strip disclosed in U.S. Pat. No. 1,928,447 to Cornell, Jr. may be utilized to eliminate plant growth.

The need is recognized for providing an elongated plastic strip which may be buried into the ground which strip also has a cap portion. The cap portion prevents plant life from growing through the cap portion or around it. Thus, a strip of this type may be positioned adjacent to a wall, or a building, or a fence, to prevent grass or other vegetation from growing immediately adjacent to the wall, building or fence.

SUMMARY OF THE INVENTION

The subject invention relates to an elongated integral polyethylene edging strip which is adapted to have one position positioned on the ground to inhibit plant life from growing through that portion of the edging strip and the remainder embedded in the ground to hold the edging strip in place. The edging strip includes an elongated crowned cap adapted for positioning on a narrow bed of ground for covering and shielding that portion of the ground to prevent plant life from growing under the cap. Plant life is prevented from growing through the cap and that which grows over the cap may be readily removed. An elongated thin upright wall has one edge formed integral with the side of the cap adjacent to the ground and adjacent to one edge of the cap to offset the upright wall relative to the center to the cap. The upright wall is substantially coextensive with the cap. A lip is formed integral with the upright wall on the side of the upright wall adjacent to the edge of the cap which is spaced away from the upright wall. The lip has a pair of parallel spaced faces substantially perpendicular to and coextensive with the upright wall. The upright wall and the lip are adapted to be buried in the ground beneath the cap to hold the cap against lateral movement relative to the ground and to hold the cap against vertical movement relative to the ground. It is a principal object of the herein disclosed invention to provide an inexpensive edging strip to inhibit the growth of plant life in a narrow bed of ground.

It is another object of the present invention to provide an edging strip which is convenient to position in the ground and which may remain on the ground providing a minimum of obstruction.

Other objects and uses of this invention will become readily apparent to those skilled in the art upon perusal of the following specification in light of the accompanying drawing.

BRIEF DESCRIPTION OF THE DRAWING

FIG. 1 is a perspective view of an integral plastic edging strip embodying the instant invention;

FIG. 2 is a perspective view of a portion of a garden wall showing the plastic edging strip of FIG. 1 embedded in the ground adjacent to the wall in an operative position;

FIG. 3 is an enlarged cross sectional view taken on line 3—3 of FIG. 2, showing the plastic edging strip of FIG. 1 held in position by earth surrounding a portion of the edging strip; and FIG. 4 is a fragmentary perspective view showing the edging strip of FIG. 1 mounted below a fence to inhibit the growth of plants below the fence.

DESCRIPTION OF THE PREFERRED EMBODIMENT

Referring now to the drawing and especially to FIG. 1, an integral plastic edging strip generally indicated by number 10 is a specific embodiment of the herein disclosed invention. Plastic edging strip 10 is an extruded polyethylene generally consisting of a cap 12, an upright wall 14 formed integral with the cap and a pair of lips 16 and 18 formed integral with the upright wall.

Cap 12 has a uniform thin wall 19 with a convex outer surface 20 and a concave inner surface 21. This cap has an elongated edge 22 on one side and an elongated edge 24 on the opposite side parallel to edge 22.

Upright wall 14 includes a thin panel 26 which has one elongated edge 28 formed integral with concave surface 21 of the cap and a free edge 30 on the opposite side of the panel. Edge 28 of panel 26 is positioned closer to edge 24 of the cap than to edge 22 so that the upright wall is off center relative to the center of cap 12 as may be best seen in FIG. 3. The panel has a near side 32 adjacent to edge 24 of the cap and a far side 34 adjacent to edge 22.

Lip 16 which is coextensive with panel 14 has a lower face 36 and an upper face 38. Faces 36 and 38 are parallel to each other and are perpendicular to side 34. Thus, lip 16 extends outward toward edge 22 beyond the center of concave surface 21.

Lip 18 is positioned between lip 16 and concave inner surface 21 of cap 12. Lip 18 includes faces 40 and 42 which are parallel to each other. Faces 40 and 42 are parallel to faces 36 and 38 and are coextensive with those faces. As may be best seen in FIG. 3, faces 40 and 42 have a width which is greater than faces 36 and 38 so that lip 18 extends beyond the outer of concave surface 21 and beyond lip 16.

The instant edging strip is simply and economically manufactured by extruding the edging strip as a single integral part in a selected form of high density polyethylene material. After extrusion, the length of extruded polyethylene material is cut into selected lengths as is conventional and the lengths are available for insertion in the ground at a selected location.

Edging strip 10 is positioned into an operational attitude with a minimum of effort. Looking to FIGS. 2 and 3, it may be seen that edging strip 10 is positioned adjacent to a conventional garden wall 44. A slit is formed in the ground adjacent to garden wall 44. Upright wall 26 with the lips is placed in the slit in the ground. The ground is then tamped or welted down or both to allow the earth to flow over the lips to hold the edging strip in place. Once the earth has settled so that the earth engages the upright wall from both sides and lips, the edging strip is securely held in place. The upright wall prevents the cap from moving in a lateral direction.

The lips prevent the edging strip from being pulled up in a vertical direction relative to the ground.

It may be appreciated that the edging strip may be utilized in any one of a variety of applications. FIG. 2 shows edging strip 10 positioned adjacent to garden wall 44. The edging strip is positioned adjacent to the garden wall in the manner described above so that no grass or other plant life may grow through cap 12. Thus, when lawn is cut adjacent to the garden wall, there is no grass to cut immediately adjacent to the garden wall. The grass may be conveniently and quickly mowed, and it is not necessary to edge the lawn adjacent to the garden wall. Although a garden wall is shown, it may be appreciated that the edging strip is also positionable adjacent to a building structure.

FIG. 4 shows edging strip 10 mounted beneath a fence 46. It may be appreciated that the fence presents serious problems in trimming grass adjacent to the fence. After a lawn has been cut, that grass which grows adjacent to and under the fence, is not cut and must be trimmed by hands or spiral trimming equipment. Edging strip 10 may be easily inserted under the fence by cutting a slit adjacent to the fence and positioning the upright wall with the integral lips in the slit and placing the cap directly under the fence. The position of the upright wall off the center of the cap allows the slit to be made on one side or other of the fence, but the cap may have its center directly under the fence.

Once the edging strip is permanently positioned under the fence, plant life will not grow directly under the fence and mowing of a lawnmower adjacent to a fence is facilitated since the lawn may be easily mowed, and it is not necessary to trim the lawn by hand.

Although other objects and uses of the present invention will become readily apparent to those skilled in the art, and a specific embodiment of the present invention has been shown and described above, it is to be expressly understood that the instant invention is limited only by the appended claims.

What is claimed is:

1. An elongated extruded polyethylene integral edging strip adapted for positioning in the ground to inhibit plant life from growing in an elongated narrow band of ground under a portion of the edging strip comprising; an elongated crowned cap adapted for positioning in a substantially horizontal attitude on an elongated narrow band of ground for shielding the elongated narrow band of ground to inhibit plant life from growing through or over the cap, said cap having a thin wall of a uniform thickness, the thin wall of the cap being convex on its upper side and concave on its inner side to allow opposed longitudinal edges of the cap to be placed into engagement with the ground, an elongated thin flat upright wall having one elongated edge formed integral with a portion of the concave inner side of the cap and being positioned closer to one longitudinal edge of the cap than to the other longitudinal edge of the cap, said upright wall being substantially coextensive with the cap, a lower lip formed integral with the upright wall, said lower lip being substantially perpendicular to and coextensive with the upright wall, the lower lip extending toward the other longitudinal edge of the cap, and a second lip formed integral with the upright wall, said second lip being substantially perpendicular to and coextensive with the upright wall, the second lip having a width greater than the lower lip and being positioned on the same side of the wall as the lower lip, said second lip being positioned between the lower lip and the cap, said second lip extending beyond the center of the cap, said upright wall and said lips being adapted to be buried in the ground beneath the cap, whereby the buried upright wall holds the cap against any lateral movement relative to the ground and the lips cooperate with each other to hold the cap against vertical movement relative to the ground.

* * * * *